US012613042B2

(12) United States Patent
Moffitt et al.

(10) Patent No.: US 12,613,042 B2
(45) Date of Patent: Apr. 28, 2026

(54) AIR DEHUMIDIFIER

(71) Applicant: TRANE INTERNATIONAL INC.,
Davidson, NC (US)

(72) Inventors: Ronnie R. Moffitt, Harrodsburg, KY
(US); Patrick Birbarah, La Crosse, WI
(US); Kenneth J. Schultz, Onalaska,
WI (US); Chen Wei, Shanghai (CN)

(73) Assignee: TRANE INTERNATIONAL INC.,
Davidson, NC (US)

( * ) Notice: Subject to any disclaimer, the term of this
patent is extended or adjusted under 35
U.S.C. 154(b) by 322 days.

(21) Appl. No.: 18/308,425

(22) Filed: Apr. 27, 2023

(65) Prior Publication Data

US 2023/0349566 A1    Nov. 2, 2023

(30) Foreign Application Priority Data

Apr. 27, 2022    (CN) .......................... 202210456829.7

(51) Int. Cl.
*F24F 3/14* (2006.01)
*B01D 53/06* (2006.01)
*B01D 53/26* (2006.01)

(52) U.S. Cl.
CPC ............ *F24F 3/1423* (2013.01); *B01D 53/06*
(2013.01); *B01D 53/261* (2013.01);
(Continued)

(58) Field of Classification Search
CPC ............... F24F 3/1423; F24F 2003/144; F24F
2203/1032; F24F 2203/106;
(Continued)

(56) References Cited

U.S. PATENT DOCUMENTS 4,180,985 A * 1/1980 Northrup, Jr. .......... F24F 5/001
62/271
5,176,005 A * 1/1993 Kaplan ................. F24F 3/1423
62/271
(Continued)

FOREIGN PATENT DOCUMENTS

CN        1189717 C      2/2005
CN     100494793 C      6/2009
(Continued)

OTHER PUBLICATIONS

Machine-generated English translation of JP 2014181890 A, published Sep. 29, 2014.*
(Continued)

*Primary Examiner* — Frank M Lawrence, Jr.
(74) *Attorney, Agent, or Firm* — HSML P.C.

(57) ABSTRACT

The AHU includes an air dehumidifying (AD) flow path, an air regeneration (AR) flow path, a first desiccant wheel and a second desiccant wheel each in the AD flow path and the AR flow path, a first cooler heat exchanger in the AD flow path, a second cooler in the AD flow path, and a heater disposed in the AR flow path. An HVACR system includes the AHU and a chiller configured to supply chiller liquid to the first cooler heat exchanger and the second cooler heat exchanger in the AHU. A method of conditioning air in an (Continued)

HVACR system includes directing air through the air dehumidifying (AD) flow path and directing air through an air regeneration (AR) flow path to regenerate the desiccant in a first desiccant wheel and the desiccant in a second desiccant wheel.

20 Claims, 3 Drawing Sheets

(52) U.S. Cl.
CPC .. *B01D 2257/80* (2013.01); *B01D 2259/4009* (2013.01); *B01D 2259/402* (2013.01); *F24F 2003/144* (2013.01); *F24F 2203/1032* (2013.01); *F24F 2203/106* (2013.01); *F24F 2203/1072* (2013.01)

(58) Field of Classification Search
CPC .. F24F 2203/1072; F24F 3/1429; F24F 3/153; F24F 5/001; F24F 11/64; F24F 11/74; F24F 13/30; F24F 2003/1464; B01D 53/06; B01D 53/261; B01D 53/04; B01D 2257/80; B01D 2259/4009; B01D 2259/402
USPC .... 96/121, 125–128, 131, 150; 95/113, 115, 95/117; 34/80, 472, 473
See application file for complete search history.

(56) References Cited

U.S. PATENT DOCUMENTS

| | | | | |
|---|---|---|---|---|
| 5,448,895 | A * | 9/1995 | Coellner | F24F 3/1411 |
| | | | | 62/271 |
| 10,948,202 | B2 | 3/2021 | Lee et al. | |
| 2005/0268635 | A1 | 12/2005 | Moffitt | |
| 2012/0132070 | A1 * | 5/2012 | Matsuba | B01D 53/06 |
| | | | | 96/110 |
| 2022/0235950 | A1 * | 7/2022 | Caron | F24F 3/1411 |
| 2022/0260262 | A1 * | 8/2022 | Pandit | F24F 3/1423 |
| 2024/0019135 | A1 * | 1/2024 | Sachdev | B01D 53/06 |

FOREIGN PATENT DOCUMENTS

| | | | |
|---|---|---|---|
| CN | 103673113 A | * | 3/2014 |
| JP | 2010091130 A | * | 4/2010 |
| JP | 2014181890 A | * | 9/2014 |

OTHER PUBLICATIONS

Machine-generated English translation of CN 103673113 A, published Mar. 26, 2014.*
Machine-generated English translation of JP 2010-091130 A, published Apr. 22, 2010.*
Extended European Search Report; European Patent Application No. 23170220.0, Sep. 21, 2023 (9 pages).

* cited by examiner

AIR DEHUMIDIFIER

FIELD

This disclosure relates generally to a heating, ventilation, air conditioning, and refrigeration ("HVACR") systems. More specifically, this disclosure relates to a dehumidifier air handling unit ("AHU") used with chillers in HVACR systems.

BACKGROUND

HVACR systems are generally used to heat, cool, and/or ventilate an enclosed space (e.g., an interior space of a commercial building or a residential building, an interior space of a refrigerated transport unit, or the like). The HVACR system can include an AHU that conditions air for the enclosed space. A ductwork ventilation system can direct the conditioned air discharged from the AHU to the enclosed space. The AHU can include a housing, fan(s), heat exchanger(s), etc. The AHU can include a desiccant for dehumidifying air. A HVACR system can also include a chiller that provides cooled fluid for cooling the air.

BRIEF SUMMARY

In an embodiment, an HVACR system includes an air handling unit and a chiller. The air handling unit includes an air dehumidifying (AD) flow path and an air regeneration (AR) flow path separate from the AD flow path, a first desiccant wheel, a second desiccant wheel, a first cooler heat exchanger, a second cooler heat exchanger, and a heater. The first desiccant wheel is disposed in each of the AD flow path and the AR flow path and is configured to dehumidify air in the AD flow path. The second desiccant wheel is disposed in each of the AD flow path and the AR flow path and is configured to further dehumidify the air in the AD flow path. The first cooler heat exchanger is disposed in the AD flow path upstream of the first desiccant wheel and the second desiccant wheel and is configured to cool the air in the AD flow path with a chiller liquid. The second cooler heat exchanger is disposed in the AD flow path between the first desiccant wheel and the second desiccant wheel and is configured to cool the air with the chiller liquid. The heater is disposed in the AR flow path upstream of the first desiccant wheel and the second desiccant wheel. The chiller is configured to supply the chiller liquid to the first cooler heat exchanger and the second cooler heat exchanger.

In an embodiment, the chiller supplies the chiller liquid to the first cooler heat exchanger and the second cooler exchanger in parallel.

In an embodiment, the chiller is configured to supply the chiller liquid to the first cooler heat exchanger and to the second cooler exchanger at a temperature of at or above 50° F.

In an embodiment, the AR flow path directs air heated by the heater through the first desiccant wheel and the second desiccant wheel to regenerate the first desiccant wheel and the second desiccant wheel.

In an embodiment, the air handling unit includes a housing having a first air inlet, a second air inlet, a first air outlet, and a second air outlet. The AD flow path extends through the housing from the first air inlet to the first air outlet. The AR flow path extends through the housing from the second air inlet to the second air outlet separate from the AD flow path.

In an embodiment, the first desiccant wheel includes a first desiccant. The first desiccant wheel is configured to rotate to move the first desiccant between being disposed in the AD flow path and being disposed in the AR flow path. The second desiccant wheel includes a second desiccant. The second desiccant wheel is configured to rotate to move the second desiccant between being disposed in the AD flow path and being disposed in the AR flow path.

In an embodiment, the first desiccant wheel includes a first end disposed in the AD flow path and a second end disposed in the AR flow path. The second desiccant wheel includes a first end disposed in the AD flow path and a second end disposed in the AR flow path.

In an embodiment, the chiller includes a refrigerant circuit that cools the chiller liquid, the cooled chiller liquid being the chiller liquid supplied to the first cooler heat exchanger and the second cooler exchanger.

In an embodiment, the chiller liquid includes water.

In an embodiment, an air handling unit for an HVACR system includes, an air dehumidifying (AD) flow path and an air regeneration (AR) flow path separate from the AD flow path, a first desiccant wheel, a second desiccant wheel, a first cooler heat exchanger, a second cooler heat exchanger, and a heater. The first desiccant wheel is disposed in each of the AD flow path and the AR flow path and is configured to dehumidify air in the AD flow path. The second desiccant wheel is disposed in each of the AD flow path and the AR flow path and is configured to further dehumidify the air in the AD flow path. The first cooler heat exchanger is disposed in the AD flow path upstream of the first desiccant wheel and the second desiccant wheel and is configured to cool the air in the AD flow path with a chiller liquid. The second cooler heat exchanger is disposed in the AD flow path between the first desiccant wheel and the second desiccant wheel and is configured to cool the air with the chiller liquid. The heater is disposed in the AR flow path upstream of the first desiccant wheel and the second desiccant wheel.

In an embodiment, the AR flow path directs air heated by the heater through the first desiccant wheel and the second desiccant wheel to regenerate the first desiccant wheel and the second desiccant wheel.

In an embodiment, the air handling unit further includes a housing having a first air inlet, a second air inlet, a first air outlet, and a second air outlet. The AD flow path extends through the housing from the first air inlet to the first air outlet. The AR flow path extends through the housing from the second air inlet to the second air outlet separate from the AD flow path.

In an embodiment, the first desiccant wheel includes a first desiccant. The first desiccant wheel is configured to rotate to move the first desiccant between being disposed in the AD flow path and being disposed in the AR flow path. The second desiccant wheel includes a second desiccant. The second desiccant wheel is configured to rotate to move the second desiccant between being disposed in the AD flow path and being disposed in the AR flow path.

In an embodiment, the first desiccant wheel includes a first end disposed in the AD flow path and a second end disposed in the AR flow path. The second desiccant wheel includes a first end disposed in the AD flow path and a second end disposed in the AR flow path.

In an embodiment, the chiller liquid includes water.

In an embodiment, a method of conditioning air in an HVACR system includes directing air through an AD flow path of an air handling unit and directing air through an air regeneration AR flow path of the air handling unit. The directing of air through the AD flow path includes cooling, via a first cooler heat exchanger, the air with a chiller liquid, dehumidifying, via a first end of a first desiccant wheel, the air cooled by the first cooler heat exchanger using a first desiccant of the first desiccant wheel, cooling, via a second cooler heat exchanger, the air dehumidified by the first desiccant wheel using the chiller liquid, and dehumidifying, with a first end of a second desiccant wheel, the air cooled by the second cooler heat exchanger using a second desiccant of the second desiccant wheel. The directing of air through the AR flow path includes: passing air through a second end of the first desiccant wheel and through a second end of the second desiccant wheel.

In an embodiment, the directing of the air through the AD flow path includes passing the air through the first cooler heat exchanger, the first end of a first desiccant wheel, the second cooler heat exchanger, and the first end of the second desiccant wheel in that order.

In an embodiment, the method also includes rotating the first desiccant wheel to move the first desiccant between being disposed in the AD flow path and being disposed in the AR flow path, and rotating the second desiccant wheel to move the second desiccant between the first end and the second end of the second desiccant wheel.

In an embodiment, the directing of the air through the AR flow path of the air handling unit to regenerate the first desiccant and the second desiccant includes: heating the air, via a heater, prior to being passed through the second end of the first desiccant wheel and through the second end of the second desiccant wheel when a temperature of the air is below a predetermined temperature.

BRIEF DESCRIPTION OF THE DRAWINGS

Like numbers represent like features.

DETAILED DESCRIPTION

Figure 1:
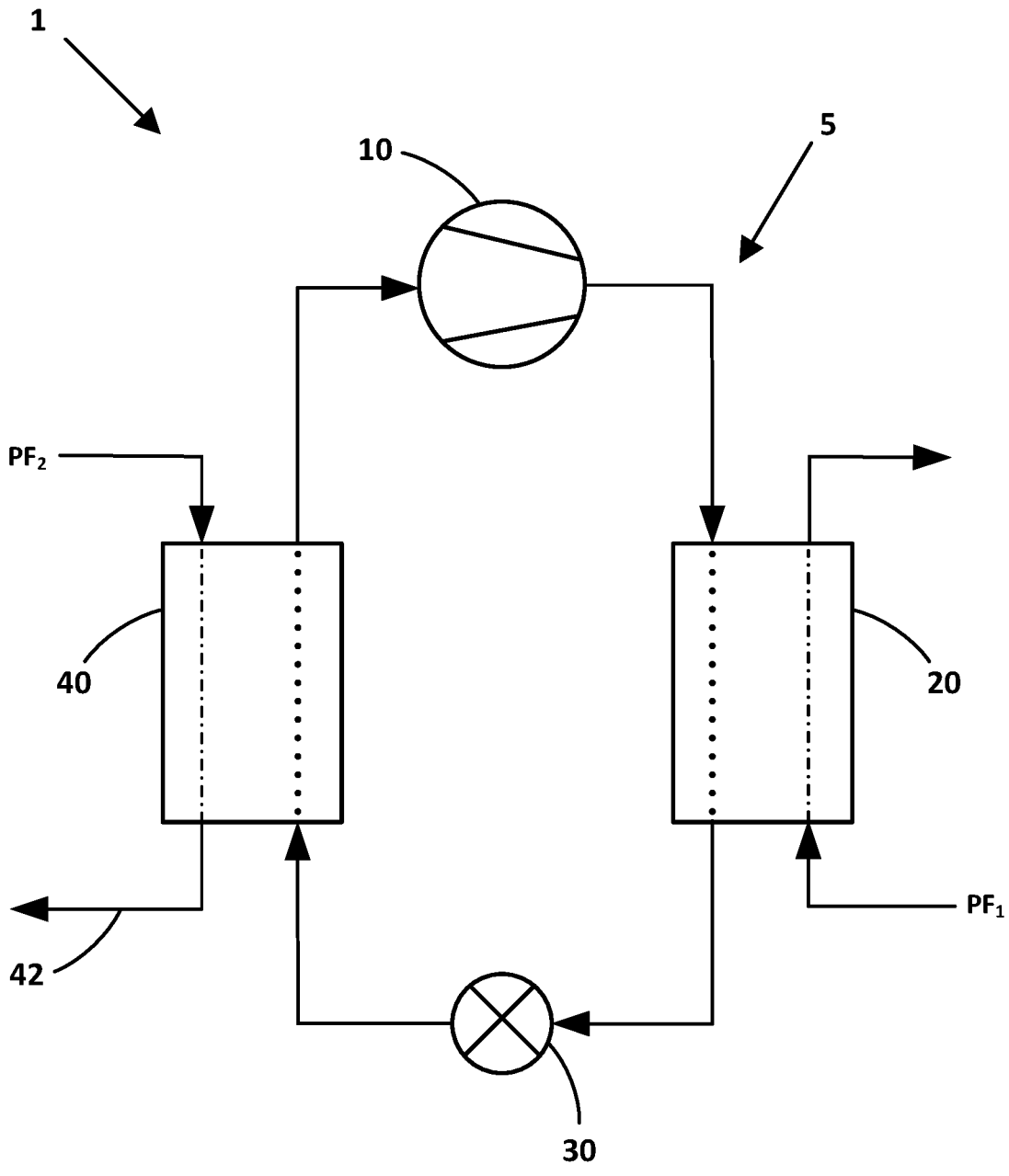
FIG. 1 is a schematic diagram of an embodiment of a chiller of a heating, ventilation, air conditioning, and refrigeration ("HVACR") system.

FIG. 1 is a schematic diagram of an embodiment of a chiller 1 of a heating, ventilation, air conditioning, and refrigeration ("HVACR") system. The chiller 1 includes a refrigerant circuit 5. The refrigerant circuit 5 includes a compressor 10, a condenser 20, an expansion device 30, and an evaporator 40. In an embodiment, the refrigerant circuit 5 can be modified to include additional components. For example, the refrigerant circuit 5 in an embodiment can include an economizer heat exchanger, one or more flow control devices, a receiver tank, a dryer, a suction-liquid heat exchanger, or the like.

Dotted lines and dotted dashed lines are provided in the Figures to indicate fluid flows through some components (e.g., compressor 10, condenser 20, evaporator 40) for clarity, and should be understood as not specifying a specific route within each component. The components of the refrigerant circuit 5 are fluidly connected. The refrigerant circuit 5 can be configured as a cooling system (e.g., a fluid chiller of an HVACR, an air conditioning system, or the like) that can be operated in a cooling mode, and/or the refrigerant circuit 5 can be configured to operate as a heat pump system that can run in a cooling mode and a heating mode.

The refrigerant circuit 5 applies known principles of gas compression and heat transfer. The refrigerant circuit heats a first process fluid $PF_1$ and cools a second process fluid $PF_2$ (e.g., external air, external water, or the like). In an embodiment, the second process fluid $PF_2$ is a chiller liquid (e.g., water, a glycol and water mixture, and the like) in a chiller circuit 42 (partially omitted in FIG. 1) that is used to cool air in the HVACR system. In another embodiment, the second process fluid $PF_2$ may be an intermediate fluid that is used to cool the chiller liquid. In an embodiment, the first process fluid $PF_1$ is air or water (e.g., building hot water, hot water for heating air, hot air for the building, ambient air, or the like).

During the operation of the refrigerant circuit 5, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, the first process fluid $PF_1$ also separately flows through the condenser 20. The first process fluid $PF_1$ absorbs heat from the working fluid as the first process fluid $PF_1$ flows through the condenser 20, which cools the working fluid and heats the first process fluid $PF_1$ as they separately flow through the condenser 20. The working fluid condenses to liquid and then flows into the expansion device 30. The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in pressure and temperature. The relatively lower temperature, vapor/liquid working fluid then flows into the evaporator 40. The second process fluid $PF_2$ also flows through the evaporator 40. The working fluid absorbs heat from the second process fluid $PF_2$ as it flows through the evaporator 40, which cools the second process fluid $PF_2$ as it flows through the evaporator 40. As the working fluid absorbs heat, the working fluid evaporates to vapor. The working fluid then returns to the compressor 10 from the evaporator 40. The above-described process continues while the refrigerant circuit 5 is operated, for example, in a cooling mode.

Figure 2:
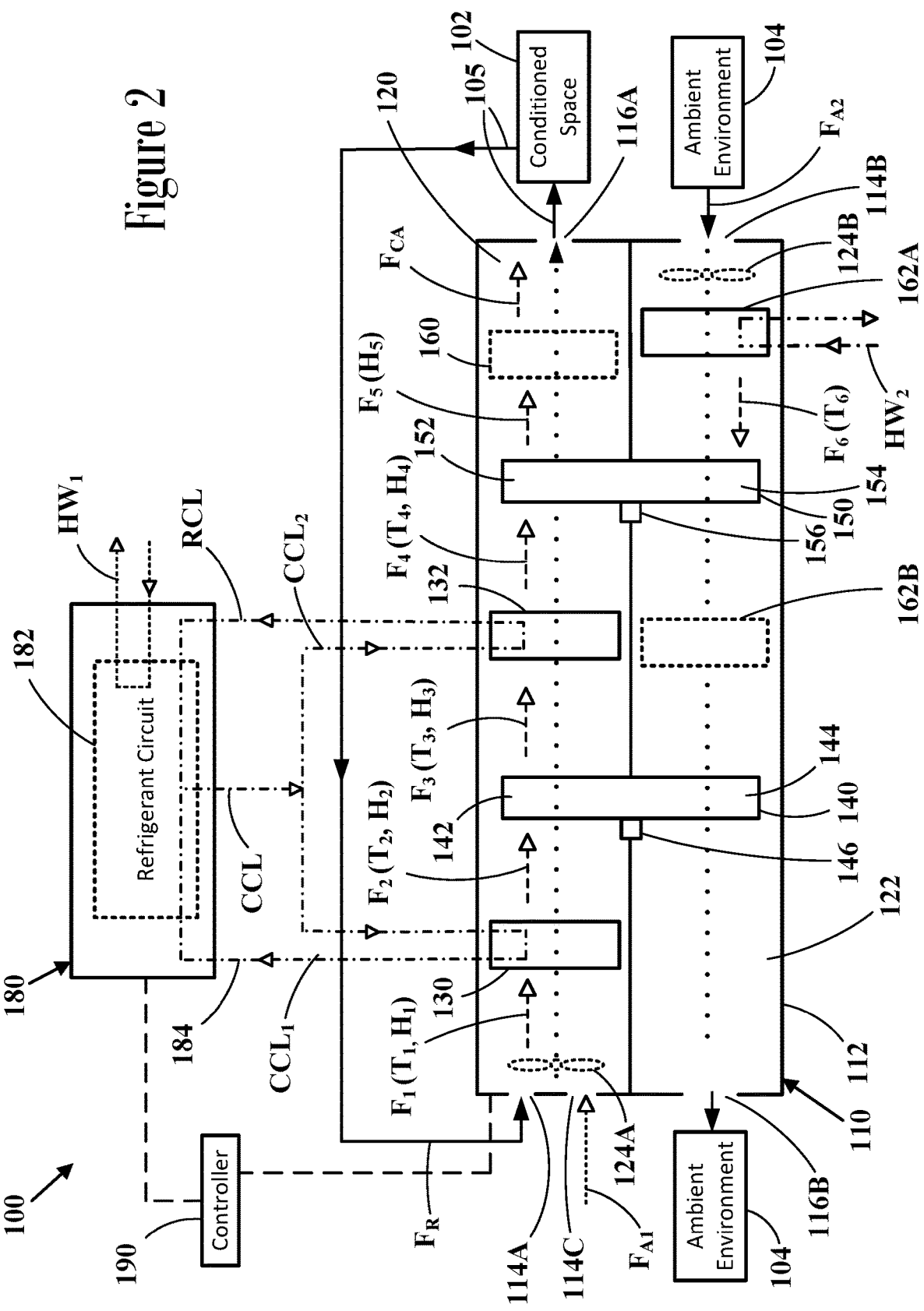
FIG. 2 is a schematic diagram of an embodiment of a HVACR system.

FIG. 2 is a schematic diagram of an embodiment of a heating, ventilation, air conditioning, and refrigeration ("HVACR") system 100. The HVACR system 100 is configured to condition (e.g., heat, cool, dehumidify, and the like) a conditioned space 102 by supplying conditioned air to the conditioned space 102. The HVACR system 100 includes a ductwork ventilation system 105, an air handling unit ("AHU") 110, and a chiller 180. The chiller 180 in an embodiment may be the chiller 1 in FIG. 1.

The AHU 110 is configured to provide conditioned air $F_{CA}$ that conditions the conditioned space 102. For example, the AHU 110 is configured to discharge conditioned air $F_{CA}$ at a particular temperature (e.g., at a predetermined temperature, within a predetermined temperature range, or the like) and at a particular humidity (e.g., at a predetermined humidity, within a predetermined humidity range, at a particular relative humidity, within a predetermined relative humidity range, or the like). For example, the particular temperature and humidity for the discharged conditioned air $F_{CA}$ can be based on the differences between a current temperature and a current humidity of the conditioned space 102 and a desired temperature and a desired humidity for the conditioned space 102.

The AHU 110 is connected to the conditioned space 102 by the ductwork ventilation system 105. The conditioned air discharged from the AHU 110 is directed to the conditioned space 102 through the ductwork ventilation system 105. The ductwork ventilation system 105 is configured to distribute the discharged conditioned air $F_{CA}$ from the AHU 110 to the conditioned space 102.

The chiller 180 is configured to produce cooled chiller liquid CCL for cooling the air in the AHU 110. In an embodiment, the chiller liquid can be water. The chiller liquid can be a liquid suitable for retaining and transferring heat in an HVACR system (e.g., water, a mixture of water and glycol, or the like). In an embodiment, the chiller liquid includes water. The chiller 180 includes a chiller circuit 184 containing the chiller liquid and at least one refrigerant circuit 182 configured to cool the chiller liquid. For example, the refrigerant circuit 182 in an embodiment can be the refrigerant circuit 5 of FIG. 1 in which the second process fluid $PF_2$ is the chiller liquid and is cooled by the refrigerant in the evaporator 40 to produce cooled chiller liquid CCL. The cooled chiller liquid CLL is used to cool air within the AHU 110. The circulation and use of the cooled liquid chiller CCL in the AHU 110 is discussed in more detail below.

In an embodiment, the chiller 180 may also produce hot water $HW_1$. For example, the refrigerant circuit(s) 182 may be configured to heat water to produce the hot water $HW_1$. Water is used to cool the refrigerant in the refrigerant circuit(s) 182 which heats the water generating the hot water $HW_1$ (e.g., the refrigerant circuit 5 of FIG. 1 in which the first process fluid $PF_1$ is water that is heated in the condenser 20 to produce hot water). The hot water $HW_1$ may be supplied to the conditioned space 102 to heat the conditioned space 102, for producing hot water for the building, for heating air in the AHU 110, etc. In an embodiment, the hot water $HW_1$ produced by the chiller 180 is at or over 90° F. For example, the chiller 180 may be configured to produce the hot water HW at up to at or about 120° F. depending on the cooling being providing by the chiller 180 and the time of year (e.g., higher during the summer).

In the illustrated embodiment, the chiller 180 is shown as a separate unit from the AHU 110. In other embodiments, the AHU 110 and chiller 180 may be incorporated into a single unit. For example, the housing 112 of the AHU 110 may contain the refrigerant circuit(s) 182 of the chiller 180 and the one or more additional air path way(s) used for the refrigerant circuit(s) 182 (e.g., the air pathways for a condenser of the refrigerant circuit 182). In such an embodiment, heater 162A may be the condenser of the refrigerant circuit 182 (e.g., the condenser 20 in FIG. 1), (e.g., instead of using hot water to transfer heat from a separate condenser heat exchanger of the refrigerant circuit 182 to the heater 162A).

The HVACR system 100 includes a controller 190. In an embodiment, the controller 190 may the controller for the entire HVACR system (e.g., an HVACR controller), for the AHU 110 (e.g., an AHU controller), or for the AHU 110 and the chiller 180. The controller 190 can be configured to control operation of the AHU 110 and the chiller 180 so that discharged conditioned air $F_{CA}$ has the desired conditioning (e.g., at the desired humidity level, at the desired temperature, and the like). For example, the controller 190 may be configured to control the rotation speed of the first desiccant wheel 140 (e.g., motor 146), rotation speed of the second desiccant wheel 150 (e.g., motor 156), the flow rate of air through the AD flow path 120 (e.g., speed of fan 124A), the flow rate of air through the AR flow path 122 (e.g., speed of fan 124B), and/or the temperature and/or flow rate of the cooled chiller liquid CCL supplied to the AHU 110 (e.g., operation of the chiller circuit 184, operation of the refrigerant circuit(s) 182, cooling by other cooling source(s) of the chiller liquid in the chiller 180, or the like). In an embodiment, the controller 190 includes memory for storing information and a processor. The controller 190 in FIG. 1 is described/shown as a single component. However, it should be appreciated that a "controller" as shown in the Figures and described herein may include multiple discrete or interconnected components that include a memory and a processor in an embodiment.

The AHU 110 includes housing 112, an air dehumidifying ("AD") flow path 120 that extends through the housing 112, and an air regeneration ("AR") flow path 122 that extends through the housing 112. The AR flow path 122 is separate from the AD flow path 120 in the AHU 110. The AD flow path 120 is configured to condition air into the discharged conditioned air $F_{CA}$ that is provided to the conditioned space 102. The AR flow path 122 is configured to regenerate the desiccants within the AHU 110. The desiccants are discussed in more detail below.

The housing 112 includes a first air inlet 114A, a first air outlet 116A, a second air inlet 114B, and a second air outlet 116B. The AD flow path 120 extends through the housing 112 from the first air inlet 114A to the first air outlet 116A. The air is conditioned in the AHU 110 as it flows through the AD flow path 120 from the first air inlet 114A to the first air outlet 116A. Air (to be conditioned) enters the AHU 110 through the first air inlet 114A, is conditioned as it flows through the AD flow path 120 in the AHU 110, and is then discharged (as conditioned air $F_{CA}$) from the first air outlet 116A. The air is cooled and dehumidified as it flows through the AD flow path 120 in the AHU 110. The configuration of the AD flow path 120 is discussed in more detail below.

The air flowing into the AD flow path 120 (e.g., the air to be conditioned to be the conditioned air $F_{CA}$) can include return air $F_R$ from the conditioned space 102, ambient air $F_{A1}$, and/or a mixture of return air $F_R$ and ambient air $F_{A1}$. This air can also be referred to as input air $F_1$. For example, the first air inlet 114A is a return air inlet which is fluidly connected to the conditioned space 102 by the ductwork ventilation system 105. As shown in FIG. 2, the ambient air $F_{A1}$ can flow into the AHU 110 through an auxiliary first air inlet 114C in the housing 112 (e.g., ambient air $F_{A1}$ and return air $F_R$ mixing in the housing 112 upstream/prior to flowing through of the first cooler heat exchanger 130). In another embodiment, the HVACR system 100 may be configured to have the ambient air $F_{A1}$ and the return air $F_R$ mix in the ductwork ventilation system 105, and the mixed air flowing into the AHU 110 through the first air inlet 114A. The input air $F_1$ as it flows through the AD flow path 120 is conditioned and becomes the conditioned air $F_{CA}$. For example, the conditioned air $F_{CA}$ is the input air $F_1$ after being cooled and dehumidified in the AD flow path 120.

The HVACR system 100 and the AHU 110 have a cooling mode. In the cooling mode, input air $F_1$ enters the housing 112 of the AHU 110, is cooled and dehumidified in the AD flow path 120 within the AHU 110, and the cooled and dehumidified air $F_{CA}$ is then discharged from the housing 112 and to conditioned space 102. In the cooling mode, the flow of conditioned air $F_{CA}$ discharged from the first air outlet 116A of the AHU 110 for the conditioned space 102 is air that has been cooled and dehumidified air within the AHU 110.

In an embodiment, the AHU 110 may include a heater 160 (e.g., electric heater, gas combustion heater, hot water/fluid heat exchanger, or the like) disposed in the AD flow path 120 downstream of the second desiccant wheel 150. In a dehumidification mode, the heater 160 may be used to reheat the further dehumidified air $F_5$ discharged from the second desiccant wheel 152 in the AD flow path 160.

In an embodiment, the HVACR system 100 may have a no air recycle configuration in which the AHU 110 does not utilize any return air $F_R$ (e.g., the AD flow path 120 of the AHU 110 uses 100% ambient air $F_{A1}$) which may be utilized by the HVACR 1 in any of its various modes (e.g., heating mode, cooling mode, and the like). For example, the AHU 110 in the no air recycle configuration may block the first air inlet 114A for the return air $F_R$.

The conditioned air $F_{CA}$ flows from the first air outlet 116A into the conditioned space 102. As shown in FIG. 2, the ductwork ventilation system 105 can respectively connect to the first air inlet 114A and the first air outlet 116A of the AHU 110. Ductwork ventilation system 105 can direct the conditioned air $F_{CA}$ from the first air outlet 116A to the conditioned space 102, and can return air $F_R$ from the conditioned space 102 back to the first air inlet 114A. In an embodiment, the HVACR system 100 may not utilize return air $F_R$ (e.g., would be configured to only use 100% ambient air $F_{A1}$. For example, in such an embodiment, the ductwork ventilation system 105 would not include the portion that supplies return air $F_R$ from the conditioned space 102 back to the AHU 110 or would be blocked in certain operating conditions, e.g. the no air recycle configuration.

The AR flow path 122 extends through the housing 112 from the second air inlet 114B to the second air outlet 116B. The air flowing through the AR flow path 122 is hydrated by the desiccant(s) and regenerates the desiccant(s) within the AHU 110. The desiccant(s) are discussed in more detail below. Ambient air $F_{A2}$ from the ambient environment 104 (e.g., external air, air from outside the building, or the like) enters the AHU 110 through the second air inlet 114B, adsorbs moisture as it flows through the AR flow path 122 in the AHU 110, and is then discharged from the second air outlet 116B into the ambient environment 104. In the illustrated embodiment, the AR flow path 122 utilizes ambient air $F_{A2}$. In another embodiment, the AR flow path 122 may utilize return air from the conditioned space 102. For example, the air flowing into AR flow path 122 (e.g., into the second air inlet 114B) and through the AR flow path 122 is and/or includes return air from the conditioned space 102. The return air supplied to the AR flow path 122 being a different portion of return air than the return air $F_R$ supplied to the AD flow path 120. In such an embodiment, the ductwork ventilation system 105 may have a portion (not shown) that connects and directs air from the conditioned space 102 to the air inlet 114B of the AR flow path 122. The configuration of the AR flow path 122 is discussed in more detail below.

The AHU 110 also includes a first cooler heat exchanger 130, a second cooler heat exchanger 132, a first desiccant wheel 140, a second desiccant wheel 150, and at least one heater 162A, 162B disposed within the housing 112. The first cooler heat exchanger 130 and the second cooler heat exchanger 132 are disposed in the AD flow path 120; the heater(s) 162A, 162B are disposed in the AR flow path 122; and the desiccant wheels 140, 150 are disposed in both the AD flow path 120 and the AR flow path 122. The configurations of cooler heat exchangers 130, 132, the desiccant wheels 140, 150, and the heater(s) 162A, 162B are each discussed in more detail below.

The first cooler heat exchanger 130 and the second cooler heat exchanger 132 each separately cool the air flowing through the AD flow path 120. The second cooler heat exchanger 132 is downstream of the first cooler heat exchanger 130 in the AD flow path 120 and cools the air in the AD flow path 120 after the first cooler heat exchanger 130. The first cooler heat exchanger 130 is disposed upstream of the first desiccant wheel 140 and the second desiccant wheel 150 in the AD flow path 120. For example, the first cooler heat exchanger 130 is disposed between the first air inlet 114A and the first desiccant wheel 140 in the AD flow path 120. The second cooler heat exchanger 132 is disposed downstream of first cooler heat exchanger 130 and the first desiccant wheel 140 and upstream of the second desiccant wheel 150 in the AD flow path 120. In the AD flow path 120, the second cooler heat exchanger 132 is disposed between the desiccant wheels 140, 150 and is configured to cool the air as it flows from the first desiccant wheel 140 to the second desiccant wheel 150.

The chiller 180 supplies the cold chiller liquid CCL to the cooler heat exchangers 130, 132. The chiller circuit 184 circulates the cold chiller liquid through the first cooler heat exchanger 130 and the second cooler heat exchanger 132. The chiller circuit 184 can include the first cooler heat exchanger 130, the second cooler heat exchanger 132, and the evaporator(s) of the one or more refrigerant circuit(s) 182 (e.g., the evaporator 40 of the refrigerant circuit 5 in FIG. 1). For example, the cold chiller liquid CCL discharged from the evaporator of the refrigerant circuit 182 is circulated/supplied to the first cooler heat exchanger 130 and the second cooler heat exchanger 132.

As shown in FIG. 2, the cooled chiller liquid CCL is supplied to the first cooler heat exchanger 130 and the second cooler heat exchanger 132 in parallel. A first stream of the cooled chiller liquid $CCL_1$ is supplied to the first cooler heat exchanger 130 and a second stream of the cooled chiller liquid $CCL_2$ is supplied to the second cooler heat exchanger 132.

In an embodiment, the chiller 180 is configured to supply the cooled chiller liquid CCL to each of the first cooler heat exchanger 130 and the second cooler heat exchanger 132 at or above 50° F. For example, the first stream of the cooled chiller liquid $CCL_1$ flowing into the first cooler heat exchanger 130 and the second stream of the cooled chiller liquid $CCL_2$ flowing into the second cooler heat exchanger 132 each have a temperature at or above 50° F. In an embodiment, the chiller 180 is configured to supply the cooled chiller liquid CCL to each of the first cooler heat exchanger 130 and the second cooler heat exchanger 132 at or above 55° F. In an embodiment, the chiller 180 is configured to supply the cooled chiller liquid CCL to each of the first cooler heat exchanger 130 and the second cooler heat exchanger 132 at 50-60° F. In an embodiment, the chiller 180 is configured to supply the cooled chiller liquid CCL to each of the first cooler heat exchanger 130 and the second cooler heat exchanger 132 at 55-60° F.

In an embodiment, the chiller 180 may supply the cooled chiller liquid CCL to each of the first the first cooler heat exchanger 130 and the second cooler heat exchanger 132 below 50° F. In such an embodiment, the HVACR system 100 can be configured to supply very dry air using such low temperature chiller liquid CCL.

In each of the cooler heat exchangers 130, 132, the chiller liquid and the air separately flow through the heat exchanger and exchange heat without physically mixing. In each of the cooler heat exchangers 130, 132, the chiller liquid absorbs heat from the air as the chiller liquid flows through the heat exchangers 130, 132, which cools the air and heats the chiller liquid. In the chiller circuit 184, the heated chiller liquid RCL then circulates back/returns from each of the cooler heat exchangers 130, 132 to the chiller 180 (e.g., is circulated back to the evaporator(s) of the refrigerant circuit(s) 182 to be cooled again). In an embodiment, the heated chiller liquid RCL discharged from each of the cooler heat exchangers 130, 132 has a temperature that is at or about 4-20° F. greater than the cooled chiller liquid CCL (e.g., is heated by 4-20° F. in the cooler heat exchangers 130, 132).

The first desiccant wheel 140 and second desiccant wheel 150 are each disposed in the both the AD flow path 120 and the AR flow path 122. As shown in FIG. 2, the first desiccant wheel 140 and the second desiccant wheel 150 are partially disposed in each of the AD flow path 120 and the AR flow path 122. The first desiccant wheel 140 is upstream of the second desiccant wheel 150 in the AD flow path 120 and is downstream of the second desiccant wheel 150 in the AR flow path 122.

The first desiccant wheel 140 has a first end 142 and a second end 144 that are opposite ends. The second desiccant wheel 150 also has a first end 152 and a second end 154 that are opposite ends. The first end and the second end are opposite each other along the border/circumference/diameter of the desiccant wheel. The first end and the second end being different circumferential portions along different arc lengths of the desiccant wheel. For example, the first end and second end may correspond to the left side (e.g., left half, or the like) and the right side (e.g., right half, or the like) of the desiccant wheel, or the first end and second end may correspond to the top side (e.g., top half, or the like) and the bottom side (e.g., bottom half, or the like) of the desiccant wheel.

The first ends 142, 152 of the desiccant wheels 140, 150 are disposed in the AD flow path 120 and the second ends 144, 154 of the desiccant wheels 140, 150 are disposed in the AR flow path 122. The air flowing through the AD flow path 120 sequentially passes through the first ends 142, 152 of the two desiccant wheels 140, 150, and the air flowing through the AR flow path 122 sequentially passes through the first ends 154, 144 of the two desiccant wheels 150, 140. As shown in FIG. 2, the air in the AD flow path 120 and the air in the AR flow path 122 pass through the two desiccant wheels 140, 150 in the opposite order. The first end 142 of the first desiccant wheel 140 is upstream of the first end 152 of the second desiccant wheel 52 in the AD flow path 120 and the second end 144 of first desiccant wheel 140 is downstream of the second end 154 of the second desiccant wheel 150 in the AR flow path 122. In the AD flow path, the first end 142 of the first desiccant wheel 140 is between the first cooler heat exchanger 130 and the second cooler heat exchanger 132 and the first end 152 of the second desiccant wheel 150 is disposed between the second cooler heat exchanger 132 and the air outlet 116A. In the AR flow path, the second end 154 of the second desiccant wheel 150 is between the heater 162A and the second end 144 of the first desiccant wheel 140.

During operation, the first desiccant wheel 140 rotates within the AD flow path 120 and the AR flow path 122, and the second desiccant wheel 150 rotates within the AD flow path 120 and the AR flow path 122. For example, the AHU 110 can include a motor 146 that rotates the first desiccant wheel 140 relative to the housing 112 and a motor 156 that rotates the second desiccant wheel 150 relative to the housing 112. In an embodiment, the first desiccant wheel 140 and the second desiccant wheel 150 may rotate at the same or different speeds. A desiccant wheel has a plurality of sectors. For example, a sector generally has a wedge shape. As each desiccant wheel 140, 150 rotates, each sector in each desiccant wheel 140, 150 is recurrently moved from being in the AD flow path 120 to being in the AR flow path 122 and then back to being in the AD flow path 120.

In an embodiment, air flows through each desiccant wheel 140, 150 by flowing through channels (not shown) that extend through the thickness of the desiccant wheel 140, 150 (e.g., left to right in FIG. 2). A desiccant wheel includes a large number of the channels. For example, a desiccant wheel can include hundreds or thousands of the channels (e.g., at least one hundred channels, at least one thousand channels). In each desiccant wheel 140, 150, the channels rotate along with the rotation of the desiccant wheel 140, 150 such that each channel is recurring moved between being in disposed in the AD flow path 120 to being disposed in the AR flow path 122.

The first desiccant wheel 140 and the second desiccant wheel 150 each include a desiccant. A desiccant can be used in the form of a coating applied to surfaces of the desiccant wheel (e.g., a resin coating containing the desiccant applied to surfaces/sides of the channels in the desiccant wheel). Air flows across the desiccant as it flows through the desiccant wheel (e.g., flows across the desiccant as the air flows through the channels in the desiccant wheel).

The first desiccant wheel 140 includes a first desiccant and the second desiccant wheel 150 includes a second desiccant. The first desiccant in the first desiccant wheel 140 and the second desiccant in the second desiccant wheel 150 may be the same kind of desiccant or different types of desiccants. In an embodiment, the desiccant in the first desiccant wheel 140 and the desiccant in the second desiccant wheel 150 are the same kind of desiccant. The desiccant(s) in the desiccant wheels 140, 150 is suitable for dehumidifying air and is able to be regenerated using heated air within the AHU 110. For example, the desiccant(s) in the desiccant wheels 140, 150 may be selected from, but are not limited to, one or more of metal organic framework desiccants, silica gels, and activated alumina.

The desiccant in each desiccant wheel 140, 150 is configured to switch between adsorbing water and desorbing water as the desiccant is rotated on its respective desiccant wheel 140, 150. Exposure of a desiccant to a flow of air that causes water desorption from the desiccant into the air (e.g., the air to hold water from the desiccant) can also be referred to as regenerating the desiccant. In each desiccant wheel 140, 150, the desiccant is configured to adsorb water from the air in the AD flow path 120 and to be regenerated by the air in the AR flow path 122. The adsorbed water in the desiccant is desorbed into the air in the AR flow path.

The HVACR system 100 may also include one or more fan(s) 124A, 124B that blow and direct air through the AHU 110, the ductwork ventilation system 105, etc. As shown in FIG. 2, the AHU 110 can include a fan 124A that blows the air through AD flow path 120 and a fan 124B that blows the air through the AR flow path 122. As shown in FIG. 2, the fan(s) 124A, 124B can be disposed within the housing 112. It should be appreciated that the fan(s) 124 in other embodiments may be located external to the AHU 110 (e.g., in the ductwork ventilation system 105, or the like). It should also be appreciated that the HVACR system 100 may also include other components than those shown in FIG. 2 (e.g., air filters, air scrubbers, child fluid reservoir, chiller liquid pump, and the like).

In the AD flow path 120, the inlet air $F_1$ (e.g., return air $F_R$, the ambient air $F_{A1}$, or a mixture thereof) flows through the first cooler heat exchanger 130, the first end 142 of the first desiccant wheel 140, the second cooler heat exchanger 132, and then the first end 152 of the second desiccant wheel 150 in that order. The air is cooled in the first cooler heat exchanger 130, is dehumidified in the first desiccant wheel 140, is cooled in the second cooler heat exchanger 50, and is then further dehumidified in the second desiccant wheel 150.

The first cooler heat exchanger 130 cools the air with the cooled chiller liquid CCL. The first stream of cooled chiller liquid $CCL_1$ absorbing heat from the air as it flows through the first cooler heat exchanger 130, which cools the air separately flowing through the first cooler heat exchanger. The first cooler heat exchanger 130 discharging cooled air $F_2$. In some operating situations (e.g., when the humidity $H_1$ of the input air $F_1$ relatively high, a relative humid day in which ambient air $F_{A1}$ has relative high humidity, or the like), the cooling of the air $F_1$ by the first cooler heat exchanger 130 may cause some condensation of the moisture in the air within the first cooler heat exchanger 130 (e.g., the cooling causing some condensation of moisture in the air on the coil(s), which is then removed through a drip tray of the heat exchanger). Thus, the first cooler heat exchanger 130 can also provide some dehumidification of the air $F_1$ (e.g., input air humidity $H_1 \geq$ cooled air humidity $H_2$). In an embodiment, the first cooler heat exchanger 130 is configured to discharge the cooled air $F_2$ at a temperature $T_2$ of at or about 55-65° F. In an embodiment, the first cooler heat exchanger 130 is configured to discharge the cooled air $F_2$ at a temperature $T_2$ of at or about 55-65° F. In an embodiment, the first cooler heat exchanger 130 is configured to discharge the cooled air $F_2$ at a temperature $T_2$ of less than 65° F.

The cooled air $F_2$ discharged from the first cooler heat exchanger 40 is then dehumidified by the first desiccant wheel 140. As the air flows through the first end 142 of the first desiccant wheel 140, the desiccant in the first desiccant wheel 140 adsorbs moisture from the air lowering the humidity of the air (e.g., input air humidity $H_1$/cooled air humidity $H_2$>dehumidified air humidity $H_3$). For example, the lower temperature $T_3$ of the air $F_2$ allows for the desiccant to efficiently remove water from the air as it flows through the first desiccant wheel 140. The moisture adsorption by the desiccant is exothermic such that the dehumidifying of the air by the desiccant wheel 40 also increases the temperature of the air (e.g., dehumidified air temperature $T_3$>cooled air temperature $T_2$). The first desiccant wheel 140 discharges relatively hotter, partially dehumidified air $F_3$.

The relatively hotter, partially dehumidified air $F_3$ discharged from the first desiccant wheel 140 is then cooled by the second cooler heat exchanger 132. The second cooler heat exchanger 132 cools the air with the cooled chiller liquid CCL. The second stream of cooled chiller liquid $CCL_2$ absorbing heat from the air as it flows through the second cooler heat exchanger 132, which cools the air separately flowing through the second cooler heat exchanger 132. The second cooler heat exchanger 132 discharges relatively cooler, partially dehumidified air $F_4$ (e.g., partially dehumidified air $F_3$ that has been cooled). In an embodiment, the second cooler heat exchanger 132 is configured to discharge the air $F_4$ at a temperature $T_4$ of at or about 55-65° F. For example, the second cooler heat exchanger 132 can be configured to at least remove the heat added to the air in the first desiccant wheel 140 (e.g., air temperature $T_4 \approx$ air temperature $T_2$). In an embodiment, the second cooler heat exchanger 132 is configured to discharge the relatively cooler, partially dehumidified air $F_4$ at a temperature $T_4$ of at or about 55-65° F. In an embodiment, the second cooler heat exchanger 132 is configured to discharge the air $F_4$ at a temperature $T_4$ of less than 65° F.

The cooler, partially dehumidified air $F_4$ discharged from the second cooler heat exchanger 132 is then dehumidified by the second desiccant wheel 150. As the air flows through the first end 152 of the second desiccant wheel 150, the desiccant in the second desiccant wheel 150 adsorbs moisture from the air lowering the humidity of the air (e.g., cooled, partially dehumidified air humidity $H_4$>dehumidified air humidity $H_5$). As similarly discussed above, the water adsorption by the desiccant also partially heats the air. The second desiccant wheel 150 discharges further dehumidified air $F_5$. As shown in FIG. 2, the further dehumidified air $F_5$ is the conditioned air $F_{CA}$ discharged from the AHU 110.

In a cooling mode, the further dehumidified air $F_5$ is the conditioned air $F_{CA}$ discharged from the AHU 110. In an embodiment, the further dehumidified air $F_5$ may be reheated by the heater 160, and the heated, further dehumidified air discharged from the heater 160 is the conditioned air $F_{CA}$ (e.g., in a dehumidification mode).

The first desiccant wheel 140 and second desiccant wheel 150 work sequentially to dehumidify the air to the desired level. In an embodiment, the first desiccant wheel 140 and second desiccant wheel 150 are configured to dehumidify the air to have a dew point of at or less than 50° F. (e.g., humidity $H_5 \leq$ a dew point of at or less than 50° F.). In an embodiment, the first desiccant wheel 140 and second desiccant wheel 150 are configured to dehumidify the air to have a dew point of at or less than 45° F. (e.g., humidity $H_5 \leq$ a dew point of at or less than 45° F.).

As a section of a desiccant wheel 140, 150 is rotated through the AD flow path 120, the desiccant in said section becomes more saturated as it rotates through the AD flow path 120 (e.g., desiccant in the section closest to being rotated back into the AR flow path 122 has the highest moisture saturation, desiccant in the section that has just been rotated into the AD flow path 120 has the lowest moisture saturation). In an embodiment, the first desiccant wheel 140 and the second desiccant wheel 150 are rotated in opposite directions. For example, the first desiccant wheel 140 rotates clockwise while the second desiccant wheel 150 rotates counter-clockwise. This can advantageously cause the air that has passed through the most saturated/used desiccant in first desiccant wheel 140 to the pass through the least saturated/used desiccant in the second desiccant wheel 150. In an embodiment, the second cooler heat exchanger 132 is configured to limit mixing of the partially dehumidified air $F_3$ as it passes through the second cooler heat exchanger 132. One non-limiting example for the second cooler heat exchanger 132 is a tube and fin heat exchanger coil which generally have a design that does not promote mixing of air as they pass between the heat exchanger. In another embodiment, the first desiccant wheel 140 and the second desiccant wheel 150 may be configured to rotate in the same direction.

For example, in conventional dehumidifying chiller systems, low temperature chiller fluid (e.g., chiller fluid cooled to 40-45° F.) is needed for cooling the air to allow the desiccant to sufficiently dehumidify the air. In an embodiment, the HVACR system 100 can advantageously provide lower humidity air (e.g., having a dew point of at or less than 50° F., having a dew point of at or less than 45° F., or the like) using a higher temperature chiller liquid (e.g., at or above 50° F.). This allows for the HVACR system 100 to operate at a higher efficiency compared to conventional dehumidifying chiller systems. In some embodiments, this can allow the HVACR system 100 to provide sufficient air dehumidification while using other source(s) for cooling the air (e.g., geothermal cooling, ambient water cooling, sea water cooling, etc.)

In the AR flow path 122, air (e.g., ambient air $F_{A2}$) flows through the first heater 162A, the second end 154 of the second desiccant wheel 150, and the second end 144 of the first desiccant wheel 140 in that order. The air $F_6$ in the AR flow path 122 accepts moisture from the second desiccant in the second desiccant wheel 150, and accepts moisture from the first desiccant in the first desiccant wheel 140. The air in the AR flow path 122 regenerates the desiccants in the first desiccant wheel 140 and in the second desiccant wheel 150.

The heater(s) 162A, 162B in the AR flow path 122 are configured to provide hot air $F_6$ at a temperature sufficient to regenerate the desiccant in each of the desiccant wheels 140, 150. The heater 162A can heat the air and discharges hot air $F_6$. In an embodiment, the heater 162A is configured to heat the air to a temperature $T_6$ that is sufficient to regenerate the desiccant in each of the desiccant wheels 140, 150. In another embodiment, the first heater 162A is configured to heat the air to a temperature T6 that is sufficient to regenerate the desiccant in the second desiccant wheel 150, and a second heater 162B is used to heat the air (e.g., reheat the air, increase the temperature of the air) to a temperature sufficient to regenerate the desiccant in the first desiccant wheel 140. In some conditions (e.g., during a hot day in the summer, or the like), the ambient air $F_{A2}$ may already be at or above said temperature $T_6$. In such conditions, at least the first heater 162A would not need to provide heating to the ambient air FA₂.

In an embodiment, the heater 162A may be a heater heat exchanger that uses hot water $HW_2$ to heat the air. The air absorbs heat from the hot water $HW_2$ as they separately flow through the heater 162A, which heats the air flowing through the heater 162. For example, the heater 162A may use the hot water $HW_1$ generated by the chiller 180 (i.e., $HW_2$ and $HW_1$ being the same in FIG. 2). For example, the heater 162A may use hot water $HW_2$ generated by a heat pump. In another embodiment, the heater 162A be a type configured to generate the heat used for heating the air (e.g., a combustion heater, electrical heater, or the like) In an embodiment, the heater 162A is configured to heat the air to a temperature $T_6$ of above 80° F. In an embodiment, the heater 162A is configured to heat the air to a temperature $T_6$ of above 85° F. In an embodiment, the heater 162A is configured to heat the air to temperature between 80-120° F. In an embodiment, the heater 162A is configured to heat the air to a temperature between 115-125° F. In an embodiment, the heater 162A is configured to heat the air to a temperature between 115-120° F. In an embodiment, the second heater 162B may have a respective configuration as similarly described for the first heater 162A (e.g., may be a heater heat exchanger that uses hot water $HW_2$, be a combustion heater, be an electrical heater, or the like).

The hot air $F_6$ discharged from the heater 162A then flows through the first desiccant wheel 140 and the second desiccant wheel 150. The hot air $F_6$ flows through the second end 144 of the first desiccant wheel 140 and the second end 154 of the second desiccant wheel 150. As the air $F_6$ flows through the second end 144 of the first desiccant wheel 140 in the AR flow path 122, the air accepts moisture from the desiccant in the first desiccant wheel 140. As the air $F_6$ flows through the second end 154 of the second desiccant wheel 150, the air accepts moisture from the desiccant in the second desiccant wheel 150. The moisture adsorbed by the desiccant in the AD flow path 120 is accepted by the air in the AR flow path 122. The AHU 110 humidifies the air $F_{A2}$ flowing through the AR flow path 122. As shown in FIG. 2, the hot, humidified air can then be discharged from the AR flow path 122 into the ambient environment 104. The flowrate of the air through the AR flow path 122 may be controlled using the fan 162B. In an embodiment, the flowrate of the air FA2, a rotation speed of the first desiccant wheel 140, and a rotation speed of the second desiccant wheel 150 can be selected such that the air in the AD flow path 120 is dehumidified to the desired level or amount (e.g., to have at or lower than a predetermined dew point).

In the illustrated embodiment, the chiller 180 cools the chiller liquid using refrigerant (e.g., using the refrigerant in the refrigerant circuit(s) 182). However, it should be appreciated the chiller 180 in other embodiments may be configured cool the chiller liquid using one or more other cooling source(s), instead of or in addition using refrigerant. In an embodiment, the chiller 180 may be configured to utilize ambient water (e.g., sea water, lake water, cooling pond water or the like) to cool the chiller liquid. In an embodiment, the chiller 180 may be configured to utilize geothermal fluid from a geothermal well/system to cool the chiller liquid.

Figure 3:
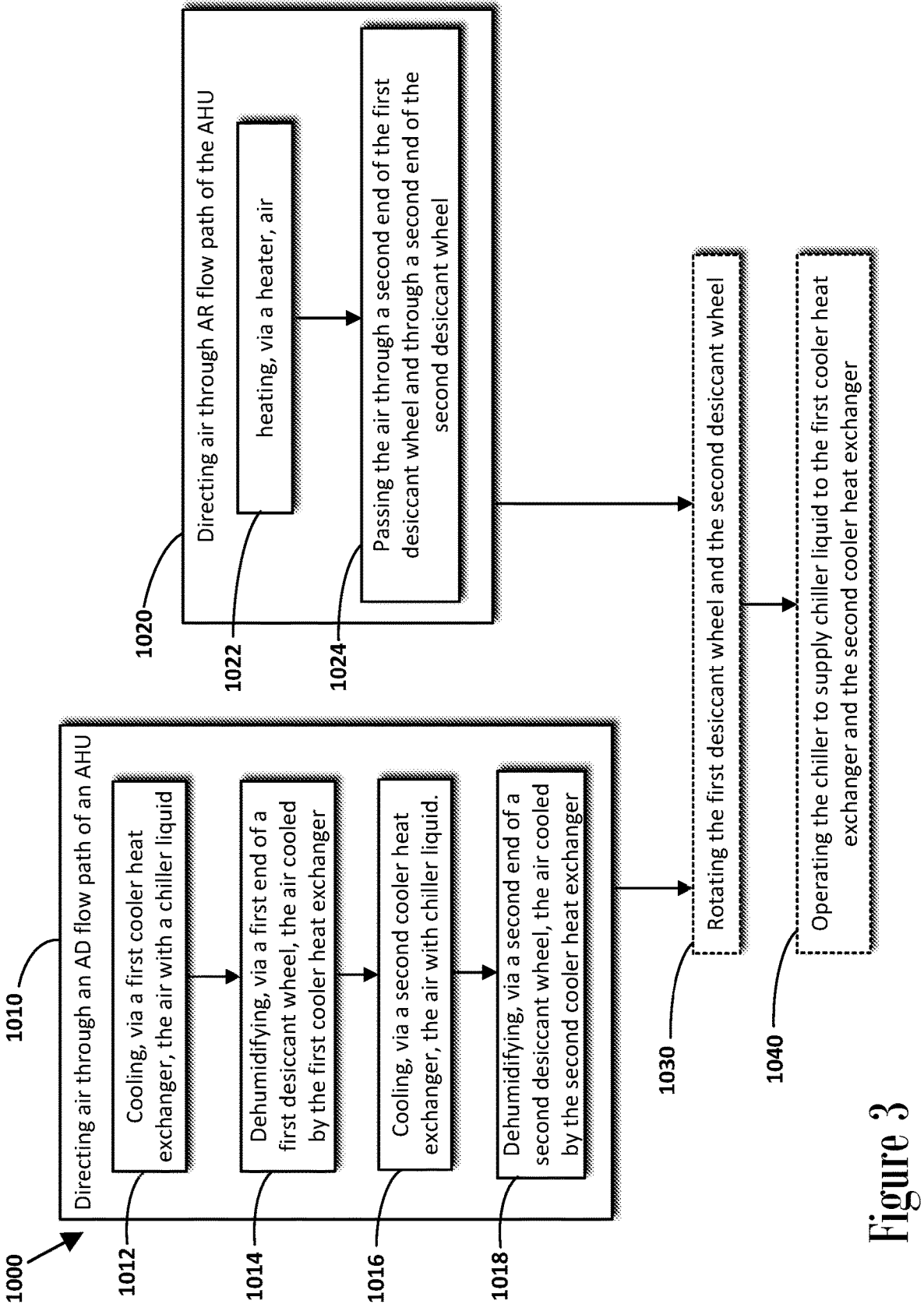
FIG. 3 is a block flow diagram of an embodiment of a method of conditioning air in an HVACR system.

FIG. 3 is a block flow diagram of a method 1000 of conditioning air in an HVACR system. In an embodiment, the method 1000 may be used for controlling the HVACR system 100 in FIG. 2. For example, the method 1000 may be carried out by the controller 190 of HVACR system 100 in FIG. 2. The method 1000 starts at 1010 and/or 1020.

At 1010, air (e.g., input air $F_1$) is directed through an AD flow path (e.g., AD flow path 120) of an AHU (e.g., AHU 110) of the HVACR system. Directing the air through the AD flow path at 1010 conditions the air as it flows through the AD flow path. Directing the air through the AD flow path at 1010 includes 1012, 1014, 1016, and 1018.

At 1012, a first cooler heat exchanger of the AHU (e.g., first cooler heat exchanger 130) cooling the air with a chiller liquid (e.g., cooled chiller liquid CCL). In an embodiment, the first cooler heat exchanger cools the air using a first stream of chiller liquid (e.g., first stream of cooled chiller liquid $CCL_1$) supplied from a chiller (e.g., chiller 1, chiller 180). The cooling of the air by the first cooler heat exchanger at 1012 may also provide some dehumidification of the air (e.g., the cooling causing some condensation of moisture in the air on the coil(s), which is then removed through a drip tray of the heat exchanger). The method 1000 then proceeds to 1014.

At 1014, a first end of a first desiccant wheel (e.g., first end 142 of first desiccant wheel 140) dehumidifies the air cooled by the first cooler heat exchanger (e.g., cooled air $F_2$). The air is dehumidified by a first desiccant in the first desiccant wheel. The first desiccant adsorbing moisture from the air as it flows through the first end of the first desiccant wheel. The method 1000 then proceeds to 1016.

At 1016, a second cooler heat exchanger of the AHU (e.g., second cooler heat exchanger 132) cools the air dehumidified by the first desiccant wheel (e.g., dehumidified air $F_3$) with chiller liquid (e.g., cooled chiller liquid CCL). In an embodiment, the second cooler heat exchanger cools the air using a second stream of the chiller liquid supplied from the chiller (e.g., second stream of cooled chiller liquid $CCL_2$). The method 1000 then proceeds to 1018.

At 1018, a first end of a second desiccant wheel (e.g., first end 152 of second desiccant wheel 150) dehumidifies the air cooled by the second cooler heat exchanger (e.g., partially dehumidified, cooled air $F_4$). The second desiccant wheel further dehumidifies the air. The air is dehumidified by a second desiccant in the second desiccant wheel. The second desiccant adsorbs moisture from the air as it flows through the first end of the second desiccant wheel.

At 1020, =air (e.g., ambient air $F_{A2}$, return air, a combination thereof, or the like) is directed through an AR flow path (e.g., AR flow path 122) of the AHU. The air is directed through the AR flow path at 1020 so as to regenerate the first desiccant in the first desiccant wheel and the second desiccant in the second desiccant wheel. Directing the air through the AR flow path 1020 includes 1022 and 1024.

At 1022, a heater (e.g., heater 162) may heat the air. For example, the air is heated to a temperature (e.g., air temperature $T_6$) to sufficiently regenerate the first desiccant and the second desiccant while being rotated through the AR flow path on the first desiccant wheel and the second desiccant wheel, respectively. In some situations, (e.g., hot summer day, or the like), the ambient air may already be at said temperature and the air is not heated by the heater. For example, when the air is at or above the predetermined temperature (e.g., air temperature $T_6$), the method 1000 may not include 1022. In an embodiment, the heater is configured to heat the air based on whether the temperature of said air entering the AR flow path is at or above the predetermined temperature (e.g., heats the air when it is less than the predetermined temperature). The method 1000 then proceeds to 1024.

At 1024, the heated air (e.g., hot air $F_6$) is passed through a second end of the second desiccant wheel (e.g., second end 154 of second desiccant wheel 150) and through a second end of the first desiccant wheel (e.g., second end 144 of first desiccant wheel 140). The heated air configured to regenerate the first desiccant and the second desiccant in the first desiccant wheel and the second desiccant wheel, respectively.

The method 1000 can also include 1030. The method 1000 can proceed from 1010 and/or 1020 to 1030. At 1030, the first desiccant wheel is rotated and the second desiccant wheel is rotated. For example, rotating the first desiccant wheel at 1030 can include rotating the first desiccant wheel to move the first desiccant between being disposed in the AD flow path and being disposed in the AR flow path. For example, rotating the second desiccant wheel at 1030 can include rotating the second desiccant wheel to move the second desiccant between being disposed in the AD flow path and being disposed in the AR flow path. In an embodiment, rotating the first desiccant wheel and the second desiccant wheel at 1030 can include the rotating of the first desiccant wheel is in one of clockwise or counter clockwise direction, and the rotating of the second desiccant wheel is in a different one clockwise or counter clockwise.

FIG. 3 shows 1030 occurring after 1010 and 1020. However, it should be appreciated that 1010, 1020, and 1030 in an embodiment can occur simultaneously. For example, 1010, 1020, 1030 can all be part of a method of operating an AHU in which directing input air through the AD flow path 1010, directing air through the AR flow path 1020, and rotating of the desiccant wheels 1030 all occur simultaneously.

The method 1000 can also include 1040. At 1040, the chiller operates to supply the chiller liquid to the first cooler heat exchanger and the second cooler chiller heat exchanger. For example, the chiller supplies the chiller liquid to the first cooler heat exchanger and the second cooler chiller heat exchanger in parallel. Operating of the chiller at 1040 can include operating refrigerant circuit(s) (e.g., refrigerant circuit 5, refrigerant circuit 182) of the chiller to cool the chiller liquid. In an embodiment, operating of the chiller 1040 can include operating the refrigerant circuits to generate hot water (e.g., $HW_1$). FIG. 3 shows 1040 occurring after 1010, 1020, and 1030. However, it should be appreciated that 1040 can occur simultaneously with 1010, 1020, and 1030 in an embodiment.

It should be appreciated that the method 1000 in an embodiment may include features as shown and/or discussed above for the chiller 1 of FIG. 1 and/or the HVACR system 100 in FIG. 2.

ASPECTS

Any of Aspects 1-9 may be combined with any of Aspects 10-19, and any of Aspects 10-15 may be combined with any Aspects 16-19.

Aspect 1. An HVACR system, comprising: an air handling unit including: an air dehumidifying (AD) flow path and an air regeneration (AR) flow path separate from the AD flow path, a first desiccant wheel disposed in each of the AD flow path and the AR flow path, the first desiccant wheel configured to dehumidify air in the AD flow path, a second desiccant wheel disposed in each of the AD flow path and the AR flow path, the second desiccant wheel configured to further dehumidify the air in the AD flow path, a first cooler heat exchanger disposed in the AD flow path upstream of the first desiccant wheel and the second desiccant wheel, the first cooler heat exchanger being a heat exchanger configured to cool the air in the AD flow path with a chiller liquid, a second cooler heat exchanger disposed in the AD flow path between the first desiccant wheel and the second desiccant wheel, the second heat exchanger configured to cool the air with the chiller liquid, a heater disposed in the AR flow path upstream of the first desiccant wheel and the second desiccant wheel; and a chiller configured to supply the chiller liquid to the first cooler heat exchanger and the second cooler heat exchanger.

Aspect 2. The HVACR system of Aspect 1, wherein the chiller supplies the chiller liquid to the first cooler heat exchanger and the second cooler exchanger in parallel.

Aspect 3. The HVACR system of any one of Aspects 1-2, wherein chiller is configured to supply the chiller liquid to the first cooler heat exchanger and to the second cooler exchanger at a temperature of at or above 50° F.

Aspect 4. The HVACR system of any one of Aspects 1-3, wherein the AR flow path directs ambient air through the first desiccant wheel and the second desiccant wheel to regenerate the first desiccant wheel and the second desiccant wheel.

Aspect 5. The HVACR system of any one of Aspects 1-4, wherein the air handling unit includes a housing having a first air inlet, a second air inlet, a first air outlet, and a second air outlet, the AD flow path extending through the housing from the first air inlet to the first air outlet, and the AR flow path extending through the housing from the second air inlet to the second air outlet separate from the AD flow path.

Aspect 6. The HVACR system of any one of Aspects 1-5, wherein the first desiccant wheel includes a first desiccant, the first desiccant wheel being rotatable to move the first desiccant between being disposed in the AD flow path and being disposed in the AR flow path, and the second desiccant wheel includes a second desiccant, the second desiccant wheel being rotatable to move the second desiccant between being disposed in the AD flow path and being disposed in the AR flow path.

Aspect 7. The HVACR system of any one of Aspects 1-6, wherein the first desiccant wheel includes a first end disposed in the AD flow path and a second end disposed in the AR flow path, and the second desiccant wheel includes a first end disposed in the AD flow path and a second end disposed in the AR flow path.

Aspect 8: The HVACR system of any one of Aspects 1-7, wherein the chiller includes a refrigerant circuit that cools the chiller liquid, the cooled chiller liquid being the chiller liquid supplied to the first cooler heat exchanger and the second cooler exchanger Aspect 9. The HVACR system of any one of Aspects 1-8, wherein the chiller liquid includes water.

Aspect 10. An air handling unit for an HVACR system, comprising: an air dehumidifying (AD) flow path and an air regeneration (AR) flow path separate from the AD flow path; a first desiccant wheel disposed in each of the AD flow path and the AR flow path, the first desiccant wheel configured to dehumidify air in the AD flow path; a second desiccant wheel disposed in each of the AD flow path and the AR flow path, the second desiccant wheel configured to further dehumidify the air in the AD flow path; a first cooler heat exchanger disposed in the AD flow path upstream of the first desiccant wheel and the second desiccant wheel, the first cooler heat exchanger configured to cool the air in the AD flow path with a chiller liquid; a second cooler heat exchanger disposed in the AD flow path between the first desiccant wheel and the second desiccant wheel, the second heat exchanger configured to cool the air with the chiller liquid; and a heater disposed in the AR flow path upstream of the first desiccant wheel and the second desiccant wheel.

Aspect 11. The air handling unit of Aspect 10, wherein the AR flow path directs ambient air heated by the heater through the first desiccant wheel and the second desiccant wheel to regenerate the first desiccant wheel and the second desiccant wheel.

Aspect 12. The air handling unit of any one of Aspects 10-11, further comprising: a housing having a first air inlet, a second air inlet, a first air outlet, and a second air outlet, the AD flow path extending through the housing from the first air inlet to the first air outlet, and the AR flow path extending through the housing from the second air inlet to the second air outlet separate from the AD flow path.

Aspect 13. The air handling unit of any one of Aspects 10-12, wherein the first desiccant wheel includes a first desiccant, the first desiccant wheel being rotatable to move the first desiccant between being disposed in the AD flow path and being disposed in the AR flow path, and the second desiccant wheel includes a second desiccant, the second desiccant wheel being rotatable to move the second desiccant between being disposed in the AD flow path and being disposed in the AR flow path.

Aspect 14. The air handling unit of any one of Aspects 10-13, wherein the first desiccant wheel includes a first end disposed in the AD flow path and a second end disposed in the AR flow path, and the second desiccant wheel includes a first end disposed in the AD flow path and a second end disposed in the AR flow path.

Aspect 15. The air handling unit of any one of Aspects 10-14, wherein the chiller liquid includes water.

Aspect 16. A method of conditioning air in an HVACR system, comprising: directing air through an air dehumidifying (AE) flow path of an air handling unit, which includes: cooling, via a first cooler heat exchanger, the air with a chiller liquid, dehumidifying, via a first end of a first desiccant wheel, the air cooled by the first cooler heat exchanger using a first desiccant of the first desiccant wheel, cooling, via a second cooler heat exchanger, the air dehumidified by the first desiccant wheel with the chiller liquid, and dehumidifying, with a first end of a second desiccant wheel, the air cooled by the second cooler heat exchanger using a second desiccant of the second desiccant wheel; and directing air through an air regeneration (AR) flow path of the air handling unit to regenerate the first desiccant and the second desiccant, which includes: heating, via a heater, air, and passing the air heated by the heater through a second end of the first desiccant wheel and through a second end of the second desiccant wheel.

Aspect 17. The method of Aspect 16, wherein the directing of the air through the AD flow path includes passing the air through the first cooler heat exchanger, the first end of a first desiccant wheel, the second cooler heat exchanger, and the first end of the second desiccant wheel in that order.

Aspect 18. The method of any one of Aspects 16-17, further comprising: rotating the first desiccant wheel to move the first desiccant between being disposed in the AD flow path and being disposed in the AR flow path, and rotating the second desiccant wheel to move the second desiccant between the first end and the second end of the second desiccant wheel.

Aspect 19. The method of any one of Aspects 16-18, wherein the directing of the air through the AR flow path of the air handling unit to regenerate the first desiccant and the second desiccant includes: heating the air, via a heater, prior to being passed through the second end of the first desiccant wheel and through the second end of the second desiccant wheel when a temperature of the air is below a predetermined temperature.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. An HVACR system, comprising:

an air handling unit including:

an air dehumidifying (AD) flow path and an air regeneration (AR) flow path separate from the AD flow path, a first desiccant wheel disposed in each of the AD flow path and the AR flow path, the first desiccant wheel configured to dehumidify air in the AD flow path, a second desiccant wheel disposed in each of the AD flow path and the AR flow path, the second desiccant wheel configured to further dehumidify the air in the AD flow path, a first cooler heat exchanger disposed in the AD flow path upstream of the first desiccant wheel and the second desiccant wheel, the first cooler heat exchanger being a heat exchanger configured to cool the air in the AD flow path with a chiller liquid, a second cooler heat exchanger disposed in the AD flow path between the first desiccant wheel and the second desiccant wheel, the second cooler heat exchanger configured to cool the air with the chiller liquid, a heater disposed in the AR flow path upstream of the first desiccant wheel and the second desiccant wheel; and a chiller configured to supply the chiller liquid to the first cooler heat exchanger and the second cooler heat exchanger at a temperature of at or above 50° F.

2. The HVACR system of claim 1, wherein the chiller supplies the chiller liquid to the first cooler heat exchanger and the second cooler heat exchanger in parallel.

3. The HVACR system of claim 1, wherein the AR flow path directs air through the first desiccant wheel and the second desiccant wheel to regenerate the first desiccant wheel and the second desiccant wheel.

4. The HVACR system of claim 1, wherein the air handling unit includes a housing having a first air inlet, a second air inlet, a first air outlet, and a second air outlet, the AD flow path extending through the housing from the first air inlet to the first air outlet, and the AR flow path extending through the housing from the second air inlet to the second air outlet separate from the AD flow path.

5. The HVACR system of claim 1, wherein the first desiccant wheel includes a first desiccant, the first desiccant wheel being rotatable to move the first desiccant between being disposed in the AD flow path and being disposed in the AR flow path, and the second desiccant wheel includes a second desiccant, the second desiccant wheel being rotatable to move the second desiccant between being disposed in the AD flow path and being disposed in the AR flow path.

6. The HVACR system of claim 1, wherein the first desiccant wheel includes a first end disposed in the AD flow path and a second end disposed in the AR flow path, and the second desiccant wheel includes a first end disposed in the AD flow path and a second end disposed in the AR flow path.

7. The HVACR system of claim 1, wherein the chiller includes a refrigerant circuit that cools the chiller liquid, the cooled chiller liquid being the chiller liquid supplied to the first cooler heat exchanger and the second cooler heat exchanger.

8. The HVACR system of claim 1, wherein the chiller liquid includes water.

9. The HVACR system of claim 1, wherein the heater is configured to heat the air in the AR flow path to a temperature of 80-125° F. when the air in the AR flow path is below a predetermined temperature.

10. The HVACR system of claim 1, wherein the heater is configured to heat the air in the AR flow path to a temperature of at or above 85-125° F. when the air in the AR flow path is below a predetermined temperature.

11. An air handling unit for an HVACR system, comprising:

an air dehumidifying (AD) flow path and an air regeneration (AR) flow path separate from the AD flow path;

a first desiccant wheel disposed in each of the AD flow path and the AR flow path, the first desiccant wheel configured to dehumidify air in the AD flow path;

a second desiccant wheel disposed in each of the AD flow path and the AR flow path, the second desiccant wheel configured to further dehumidify the air in the AD flow path;

a first cooler heat exchanger disposed in the AD flow path upstream of the first desiccant wheel and the second desiccant wheel, the first cooler heat exchanger configured to cool the air in the AD flow path with a chiller liquid supplied from a chiller system at a temperature of at or above 50° F.;

a second cooler heat exchanger disposed in the AD flow path between the first desiccant wheel and the second desiccant wheel, the second cooler heat exchanger configured to cool the air with the chiller liquid supplied from the chiller system; and a heater disposed in the AR flow path upstream of the first desiccant wheel and the second desiccant wheel.

12. The air handling unit of claim 11, wherein the AR flow path directs the air heated by the heater through the first desiccant wheel and the second desiccant wheel to regenerate the first desiccant wheel and the second desiccant wheel.

13. The air handling unit of claim 11, further comprising:

a housing having a first air inlet, a second air inlet, a first air outlet, and a second air outlet, the AD flow path extending through the housing from the first air inlet to the first air outlet, and the AR flow path extending through the housing from the second air inlet to the second air outlet separate from the AD flow path.

14. The air handling unit of claim 11, wherein the first desiccant wheel includes a first desiccant, the first desiccant wheel being rotatable to move the first desiccant between being disposed in the AD flow path and being disposed in the AR flow path, and the second desiccant wheel includes a second desiccant, the second desiccant wheel being rotatable to move the second desiccant between being disposed in the AD flow path and being disposed in the AR flow path.

15. The air handling unit of claim 11, wherein the first desiccant wheel includes a first end disposed in the AD flow path and a second end disposed in the AR flow path, and the second desiccant wheel includes a first end disposed in the AD flow path and a second end disposed in the AR flow path.

16. The air handling unit of claim 11, wherein the chiller liquid includes water.

17. A method of conditioning air in an HVACR system, comprising:

directing air through an air dehumidifying (AD) flow path of an air handling unit, which includes:

cooling, via a first cooler heat exchanger, the air with a chiller liquid supplied from a chiller system at a temperature of at or above 50° F., dehumidifying, via a first end of a first desiccant wheel, the air cooled by the first cooler heat exchanger using a first desiccant of the first desiccant wheel, cooling, via a second cooler heat exchanger, the air dehumidified by the first desiccant wheel with the chiller liquid, and dehumidifying, with a first end of a second desiccant wheel, the air cooled by the second cooler heat exchanger using a second desiccant of the second desiccant wheel; and directing air through an air regeneration (AR) flow path of the air handling unit to regenerate the first desiccant and the second desiccant, which includes:

passing the air in the AR flow path through a second end of the first desiccant wheel and through a second end of the second desiccant wheel, and heating, via a heater, the air in the AR flow path prior to being passed through the second end of the first desiccant wheel and through the second end of the second desiccant wheel.

18. The method of claim 17, wherein the directing of the air through the AD flow path includes passing the air through the first cooler heat exchanger, the first end of a first desiccant wheel, the second cooler heat exchanger, and the first end of the second desiccant wheel in that order.

19. The method of claim 17, further comprising:

rotating the first desiccant wheel to move the first desiccant between being disposed in the AD flow path and being disposed in the AR flow path, and rotating the second desiccant wheel to move the second desiccant between the first end and the second end of the second desiccant wheel.

20. The method of claim 17, wherein the heating of the air in the AR flow path, via the heater, is in response to a temperature of the air in the AR flow path being below a predetermined temperature.

\* \* \* \* \*